(12) United States Patent
Ebina

(10) Patent No.: US 7,322,816 B2
(45) Date of Patent: Jan. 29, 2008

(54) MOLD FOR FORMING DISK SUBSTRATE

(75) Inventor: Toshiyuki Ebina, Aichi-ken (JP)

(73) Assignee: Kabushiki Kaisha Meiki Seisakusho, Aichi-Ken (JP)

( * ) Notice: Subject to any disclaimer, the term of this patent is extended or adjusted under 35 U.S.C. 154(b) by 144 days.

(21) Appl. No.: 10/895,378

(22) Filed: Jul. 21, 2004

(65) Prior Publication Data

US 2005/0048158 A1  Mar. 3, 2005

(30) Foreign Application Priority Data

Sep. 2, 2003 (JP) ............................. 2003-309496

(51) Int. Cl.
B29C 45/43 (2006.01)
B29C 45/26 (2006.01)

(52) U.S. Cl. .................... 425/556; 425/447; 425/810

(58) Field of Classification Search ................ 425/437, 425/556, 810, 447; 264/1.33, 106
See application file for complete search history.

(56) References Cited

U.S. PATENT DOCUMENTS

| | | | |
|---|---|---|---|
| 5,006,058 A * | 4/1991 | Maruyama et al. | 425/556 |
| 5,648,106 A * | 7/1997 | Miyairi et al. | 425/810 |
| 5,693,348 A * | 12/1997 | Sakamoto et al. | 425/436 R |
| 5,720,994 A * | 2/1998 | Asai | 425/556 |
| 5,882,700 A * | 3/1999 | Asai | 425/556 |
| 6,164,955 A * | 12/2000 | Kubota | 425/556 |
| 6,382,955 B1 * | 5/2002 | Sandstrom | 425/542 |
| 6,994,900 B2 * | 2/2006 | Ebina | 428/64.1 |
| 2001/0026817 A1 * | 10/2001 | Shida et al. | 425/542 |

FOREIGN PATENT DOCUMENTS

| | | | |
|---|---|---|---|
| JP | 01138618 A | * | 5/1989 |
| JP | 01264818 A | * | 10/1989 |
| JP | 7-42682 | | 10/1995 |
| JP | 07-42682 | | 10/1995 |
| JP | 2001-54922 | * | 2/2001 |
| JP | 2003-006939 | | 10/2003 |

OTHER PUBLICATIONS

English abstract for JP 2001-54922.*

* cited by examiner

*Primary Examiner*—Robert B. Davis
(74) *Attorney, Agent, or Firm*—Browdy and Neimark, PLLC

(57) ABSTRACT

To form a disk substrate 42 having a no information area at low cost and without failure, a mold 12 is provided for forming a disk substrate 42 having a no information area 44. A cavity 32 of the mold 12 has a surface 50 corresponding to the no information area 44 and made of a mirror-surfaced plate 22. A cylindrical member (sleeve 35) is inserted in an inner hole 38 of the mirror-surfaced plate 22. An annular projection 33 is provided on the end surface of the cylindrical member adjacent to the cavity.

13 Claims, 4 Drawing Sheets

MOLD FOR FORMING DISK SUBSTRATE

BACKGROUND OF THE INVENTION

Field of the Invention

The present invention relates to a mold, for manufacturing a disk substrate, for an optical disk which is made by bonding disk substrates.

A bonded optical disk such as a DVD, etc. is made by bonding a pair of disk substrates by an adhesive, with their surfaces being opposed each other. As shown in FIG. 4, a mold 12a for manufacturing a disk substrate is comprised of a fixed mold 10 and a movable mold 11a. The fixed mold 10 is comprised of a fixed mold plate 13 which is attached to a stationary platen of an injection molding machine (not shown) via an insulation plate 14, a mirror-surfaced plate 16 secured to the surface of the fixed mold plate 13 opposite to the insulation plate 14 via a fixed counter plate 15 so as to form a laser beam incident surface, a female cutter 19 inserted and fitted in the center holes of the fixed mold plate 13, the fixed counter plate 15 and the mirror-surfaced plate 16, a sprue bush 18 inserted and fitted in center holes of the female cutter 19 and the fixed mold plate 13, a positioning plate 17 abutting against an edge surface of the sprue bush 18 and secured to the center hole of the fixed mold plate 13, and a fixed outer peripheral ring 20 inserted and fitted on the outer edge surface of the fixed counter plate 15 and the mirror-surfaced plate 16 and secured to the fixed mold plate 13.

The movable mold 11a is comprised of a movable mold plate 23, a mirror-surfaced plate 22 fixed to a surface of the movable mold plate 23 via a movable counter plate 21, on the fixed mold 10 side, a stamper 26 which is provided on the surface of the mirror-surfaced plate 22 opposite to the mirror-surfaced plate 16 and on which an information area 43 is formed, an outer stamper holder 25 to hold an outer end portion of the stamper 26 on the mirror-surfaced plate 22, an inner stamper holder 27 as a supporting member, which is loosely inserted in the center holes of the movable counter plate 21 and the mirror-surfaced plate 22 to hold an inner end portion of the stamper 26 on the mirror-surfaced plate 22, a fixed sleeve 28 which guides an inner hole of the inner stamper holder 27 thereon and is secured to the movable mold plate 23, an ejector 29 which is inserted and fitted in an inner hole of the fixed sleeve 28 to slide in the axial direction, a male cutter 30 which is inserted and fitted in an inner hole of the ejector 29 to slide in the axial direction, an ejector pin 31 which is inserted and fitted in an inner hole of the male cutter 30 and is slidable in the axial direction, and, a movable outer peripheral ring 24 which is fitted on the outer edge surfaces of the movable counter plate 21 and the mirror-surfaced plate 22 and is secured to the movable mold plate 23. The fixed mold 10 and the movable mold 11a form a mold cavity 32a when the fixed outer peripheral ring 20 is registered with, and abuts against, the movable outer peripheral ring 24.

A disk substrate formed by the mold 12a is used for manufacturing an optical disk 40 through the steps as disclosed in column 14 of Japanese Kokai (Unexamined Patent Publication) No. 2003-6939. It is not always necessary for an optical disk such as DVD, etc. to have information areas on both the disk substrates. Therefore, as described in Japanese Kokai No. 2003-6939, the mold 12a is provided with a blank stamper 26 having no information forming pits to manufacture a disk substrate having no information area. The manufacturing cost is high because this mold 12a includes a stamper 26 which is essentially unnecessary.

Furthermore, the known mold 12a has an inner stamper holder 27 to hold an inner end portion of the stamper 26 on the movable mirror-surfaced plate 22. An end portion of the inner stamper holder 27 has a flange 37 protruding into the cavity 32a to engage with the stamper 26. An air discharge groove 36b, as shown in Japanese U.M. Kokoku (Utility Model Examined Patent Publication) No. 7-42682, is provided between the surface of the inner hole of the inner stamper holder 27 and the outer peripheral surface of the fixed sleeve 28. In order to remove the disk substrate which is made of the melted resin filled, cooled and hardened in the cavity 32a, the disk substrate must be immediately released from the surface of the stamper 26. To this end, compressed air is discharged from the air discharge groove 36b toward the outer peripheral direction between the stamper 26 and the disk substrate so that the disk substrate can be released from the stamper 26. However, as the flange 37 protrudes in the outer peripheral direction of the air discharge groove 36b, the passageway of the compressed air is too narrow and too long to sufficiently feed the releasing air to the outer end extremity of the disk substrate. Consequently, the disk substrate cannot be completely released from the stamper 26, and hence, the disk substrate is left in the cavity 32a or the appearance thereof becomes bad due to a stain, haze, etc., formed on the surface.

BRIEF SUMMARY OF INVENTION

The present invention has been completed to eliminate the drawbacks of the prior art as mentioned above by providing a mold for manufacturing a disk substrate having no information area, at low cost and without failure to manufacture. The present invention is aimed to provide a mold for forming a disk substrate having no information area, wherein a surface of a cavity of the mold corresponding to the no information area of the disk substrate is comprised of a mirror-surfaced plate which has an inner hole in which a cylindrical member is inserted and fitted, and an annular projection is provided on the surface of said cylindrical member on the cavity side.

DETAILED DESCRIPTION OF INVENTION

Figure 3:
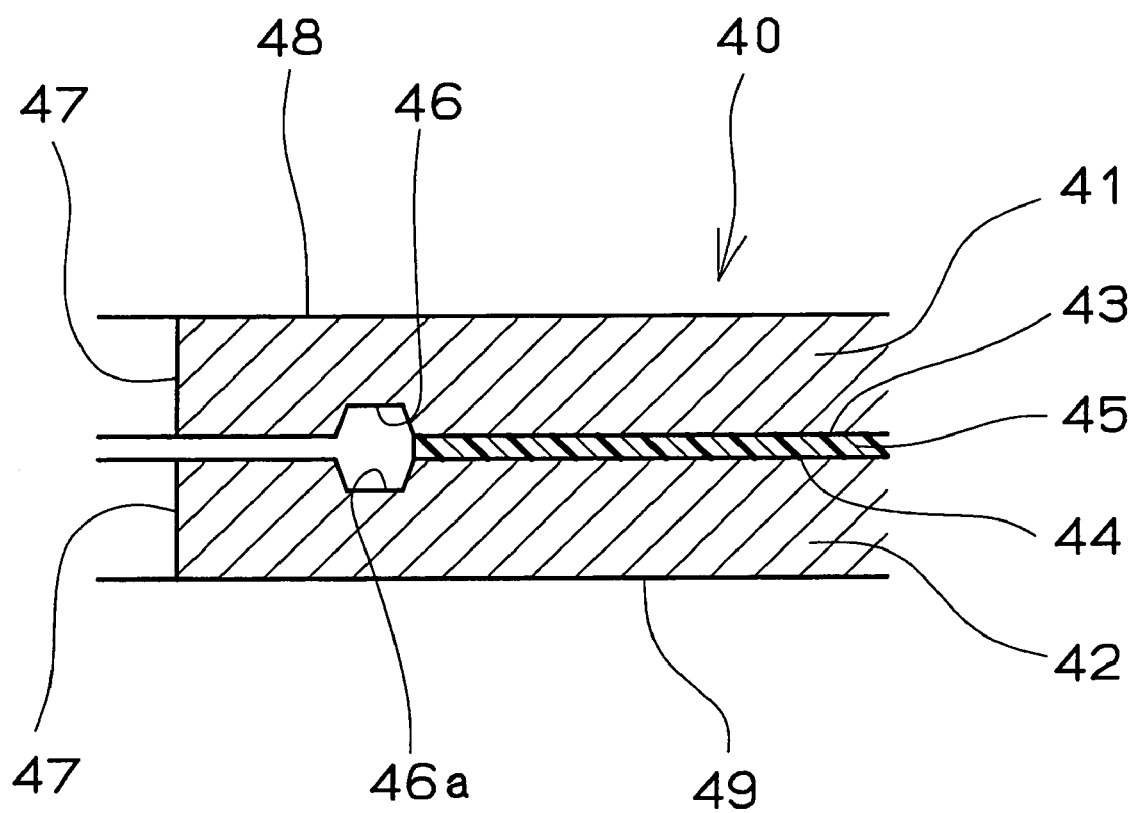
FIG. 3 is an enlarged sectional view of the vicinity of a central opening portion of an optical disk which is formed by bonded disk substrates.
Figure 4:
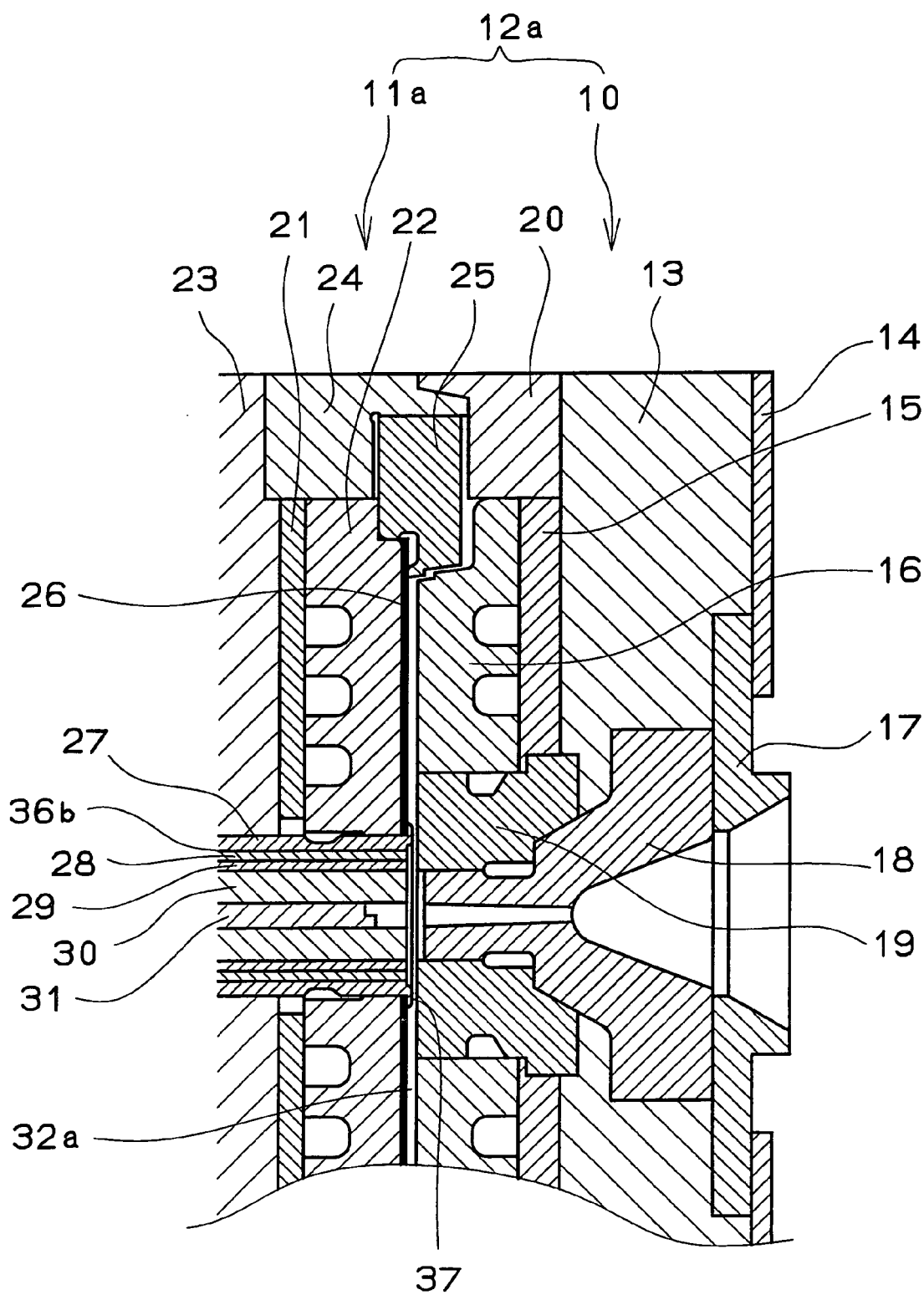
FIG. 4 is a longitudinal sectional view of a main part of a known mold for forming a disk substrate.

Embodiments of the invention will be discussed below while referring to the drawings. An optical disk 40 shown in FIG. 3 is made of a disk substrate 41 and a disk substrate 42, which are bonded to each other by an adhesive 45, with an information area 43 of the disk substrate 41 and a no information area 44 of the disk substrate 42 being opposed to each other. The information area 43 is represented by pits in the order of submicrons transferred by a stamper 26 of the mold 12a shown in FIG. 4. On the other hand, the no information area 44, which is formed in the same position as the information area 43, has no pits and is made of a planar surface same as the front surface 48 or the back surface 49 of the optical disk 40. An annular groove 46 is formed by the flange 37 of the inner stamper holder 27 of the conventional mold 12a. An annular groove 46a is formed by an annular projection 33 or 33a of the mold 12 of the embodiment of the present invention.

Figure 1:
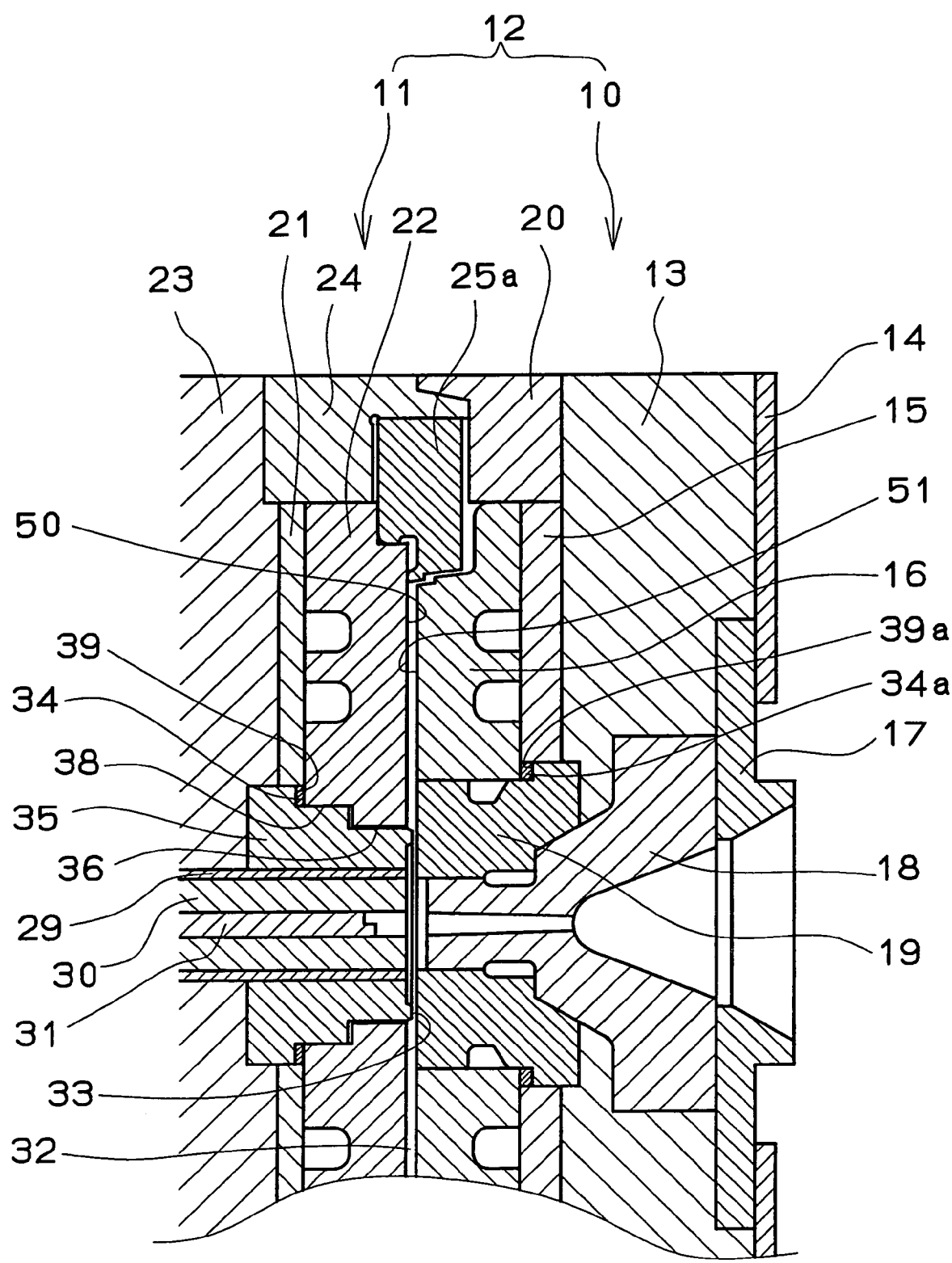
FIG. 1 is a longitudinal sectional view of a main part of a mold for forming a disk substrate of an embodiment of the present invention.

The disk substrate 42 having the no information area 44 is formed by the mold 12 shown in FIG. 1. The mold 12 for forming the disk substrate 42 is comprised of a fixed mold 10 and a movable mold 11. The fixed mold 10 is comprised of a fixed mold plate 13 which is attached to a stationary platen of an injection molding machine (not shown) via an insulation plate 14, a mirror-surfaced plate 16 by which a back surface 49 of the disk substrate 42 is formed and which is secured to the surface of the fixed mold plate 13 opposite to the insulation plate 14 via a fixed counter plate 15, a female cutter 19 inserted and fitted in the center holes of the fixed mold plate 13, the fixed counter plate 15 and the mirror-surfaced plate 16, a sprue bush 18 inserted and fitted in center holes of the female cutter 19 and the fixed mold plate 13, a positioning plate 17 abutting against an end surface of the sprue bush 18 and secured to the center hole of the fixed mold plate 13, and a fixed outer peripheral ring 20 inserted and fitted in the outer edge surface of the fixed counter plate 15 and the mirror-surfaced plate 16 and secured to the fixed mold plate 13.

The movable mold 11 is comprised of a movable mold plate 23, a mirror-surfaced plate 22 fixed to a surface of the movable mold plate 23 via a movable counter plate 21, on the fixed mold 10 side, to form the no information area 44 of the disk substrate 42, an outer peripheral ring 25a which is attached to an outer peripheral end portion of the mirror-surfaced plate 22 to form the outer periphery of the disk substrate 42, a sleeve 35 which is inserted and fitted in central openings of the movable counter plate 21 and the mirror-surfaced plate 22, an ejector 29 which is guided in an inner hole of the sleeve 35 and is slidable in the axial direction to eject the disk substrate 42, a male cutter 30 which is inserted and fitted in an inner hole of the ejector 29 and is slidable in the axial direction to engage with the female cutter 19 to thereby form a central opening 47 of the disk substrate 42, an ejector pin 31 which is inserted and fitted in an inner hole of the male cutter 30 and is slidable in the axial direction so as to eject a sprue which has been separated, from the disk substrate, at the central opening 47 and a movable outer peripheral ring 24 which is fitted on the outer peripheral end surfaces of the movable counter plate 21 and the mirror-surfaced plate 22 and is secured to the movable mold plate 23. The fixed mold 10 and the movable mold 11 form the mold cavity 32a when the fixed outer peripheral ring 20 is registered with and abuts against the movable outer peripheral ring 24. The movable mold 11 can be simple and inexpensive, in a comparison with the mold 11a (FIG. 4), because it does not have a stamper 26, an inner stamper holder 27 and the fixed sleeve 28.

The sleeve 35 is a multi-stepped cylindrical member having different diameter portions and has a shoulder 39 between the maximum diameter portion and an intermediate diameter portion. The maximum diameter portion of the sleeve 35 is inserted in the movable mold plate 23 and the intermediate diameter portion thereof is inserted in an inner hole 38 of the mirror-surfaced plate 22. An air discharge groove 36 is formed annularly between the minimum diameter portion of the sleeve 35 and a stepped inner hole 38 of the mirror-surfaced plate 22. The air discharge groove 36 opens into a cavity 32. A shoulder between the intermediate diameter portion and the minimum diameter portion of the sleeve 35 defines an annular gap together with the mirror-surfaced plate 22, so that compressed air is uniformly supplied to the air discharge groove 36 through the annular gap. The width of the air discharge groove 36 is set to be, for example, 10 through 30 micro meters, which permits a sufficient amount of air to pass therethrough but does not permit the melted resin to enter therein. As mentioned above, as the air discharge groove is provided between the cylindrical member and the inner hole of the mirror-surfaced plate, the structure of the mold becomes simple. As the air discharge groove which opens into the cavity is provided in the cavity surface out of the annular projection in the circumferential direction, disk substrate releasing air is effectively supplied to release the disk substrate and no failure in molding occurs.

The annular projection 33 which is protruded into the cavity 32 is provided on the end face of the minimum diameter portion of the sleeve 35. The annular projection 33 is substantially trapezoidal or semicircular in cross section. The height of the projection 33 is in the range of 0.15 to 0.25 mm and the width of the bottom portion is in the range of 1.5 to 5.5 mm. The maximum diameter of the annular projection 33 at the outer periphery thereof is approximately 22.2 mm, in accordance with the size of an optical disk, and the minimum diameter thereof can be optionally determined as long as the annular projection can be provided on the end surface of the sleeve 35.

The shoulder 39 of the sleeve 35 abuts against the mirror-surfaced plate 22, through a spacer 34, in a direction perpendicular to the surface of the cavity 32. A surface 50 of a cavity, which is a surface of the mirror-surfaced plate 22 adjacent to the cavity 32 can be damaged due to continuous forming operations and must therefore, be ground periodically. The spacer 34 is adapted to compensate for a decrease in the thickness of the mirror-surfaced plate 22 by grinding, so that the end surface of the sleeve 35 is always flush with the cavity surface 50. Namely, upon grinding the mirror-surfaced plate 22, the spacer 34 and the movable counter plate 21 are replaced with those having larger thicknesses by a value corresponding to reduction of the thickness of the ground mirror-surfaced plate 22. Note that a shoulder 39a of the female cutter 19 and a spacer 34a in the fixed mold 10 are provided for the same purpose as that of the shoulder 39 and the spacer 34. A surface 51 of a cavity of the mirror-surfaced plate 16 is adjusted to be flush with the end surface of the female cutter 19 on the cavity side.

Figure 2:
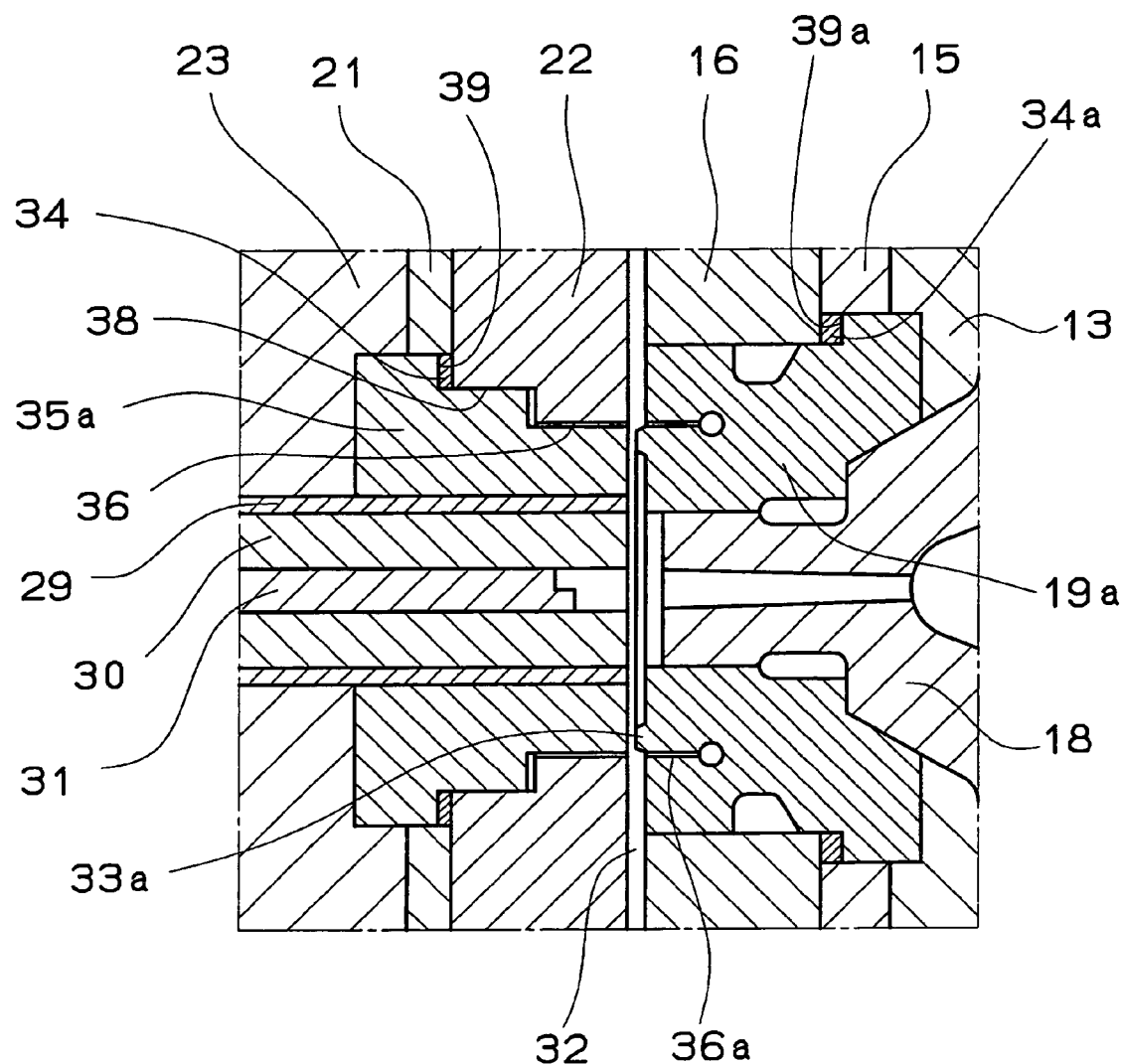
FIG. 2 is an enlarged sectional view of another embodiment of a mold for forming a disk substrate of the present invention, to show differences from FIG. 1.

FIG. 2 shows another embodiment in which the annular projection 33, which is provided on the movable mold 11 in the embodiment shown in FIG. 1, is provided on the fixed mold 10. In FIGS. 1 and 2, the same numerals refer to the same components. In FIG. 2, the components different from those illustrated in FIG. 1 are a sleeve 35a, a female cutter 19a, an annular projection 33a, and an air discharge groove 36a. The sleeve 35a of the movable mold 11 does not have the annular projection 33 and the surface of the end surface of the sleeve 35a is planar. The annular projection 33a identical to the annular projection 33 in size and position is provided on the surface of the female cutter 19a facing the cavity 32. The air discharge groove 36a is annularly formed on the outside of the annular projection 33a provided on the end surface of the female cutter 19a that is adjacent to the cavity 32. The female cutter 19a is formed of an assembly of a plurality of members so as to form the air discharge groove 36a. The female cutter 19a made of an assembly of a plurality of members is cylindrical, similar to the sleeve 35.

Therefore, in another embodiment, the cavity surfaces 50 and 51 forming the cavity 32, of the mirror-surfaced plate 22 in which the sleeve 35 provided with the annular projection 33 is inserted and fitted and the mirror-surfaced plate 16 in which the female cutter 19a provided with the annular projection 33a is inserted and fitted, respectively, are roughened to enhance the releasing capability of the disk substrate 42. The rough-surface treatment is achieved by sand blasting, electro-discharging, etc. and the irregularity of the roughened surface can be of any shape. It is preferable that the maximum height of the projections of the irregularity be in the range of 5 to 30 micrometers in terms of Ry in the Japanese Industrial Standards (JIS). The disk substrate manufactured by the mold whose surface has the roughness in the above range is semi transparent.

If a disk substrate is manufactured by the above-mentioned mold for forming a disk substrate, when an injecting device of an injection molding machine (not shown) abuts against the sprue bush 18, the melted resin can be injected to the cavity 32 via a sprue. While the melted resin, moved co-axially in the radial direction and filled in the cavity 32, is cooled and hardened, the central opening 47 is formed by the male cutter 30 and the female cutter 19 to thereby form the disk substrate 42.

Thereafter, compressed air is supplied to the air discharge groove 36 just before or just after the movement of the movable mold 11 to separate it from the fixed mold 10. The compressed air discharged from the air discharge groove 36 to the cavity 32 tends to be moved outwardly in the radial direction of the cavity 32, due to a large air flow resistance of the annular projection 33 which is present provided inwardly in the radial direction of the cavity 32. Therefore, the disk substrate 42 can be easily and quickly released from the cavity surface 50. If the cavity surface 50 is subject to rough surface treatment, the release of the disk substrate 42 can be further promoted because of a lack of no close surface contact between the disk substrate 42 and the mirror surface.

The present invention can be changed, modified or improved based on the knowledge of an artisan. Moreover, it is obvious that alternative embodiments as changed, modified or improved without departing from the spirit of the invention are included in the scope of claims of the present invention.

What is claimed is:

1. A mold for forming a first disk substrate having a first surface having a no information area and a second surface on an opposite side of the first surface of the first disk substrate, the first disk substrate being bonded to a second disk substrate by an adhesive, the second disk substrate having a first surface having an information area and a second surface on an opposite side of the first surface of the second disk substrate, the no information area on the first disk substrate being formed in the same position as the information area on the second disk substrate, the first disk substrate having a groove formed therein, and the no information area on the first surface of the first disk substrate is adhesively bonded to the information area on the first surface of the second disk substrate, the mold comprising:

a first mirror-surfaced plate forming a first surface of a cavity of said mold corresponding to the no information area on the first surface of the first disk substrate, the first mirror-surfaced plate comprising an inner hole in which a cylindrical member is inserted and fitted, said cylindrical member comprising an annular projection provided on its end surface adjacent to the cavity for forming the annular groove on the first surface of the first disk substrate;

a second mirror-surfaced plate forming a second surface of the cavity of said mold opposed to said first mirror-surfaced plate;

an annular air discharge groove, which opens into the cavity, and formed radially outside of said annular projection, and wherein the first mirror-surfaced plate and the cylindrical member constitute means for directly forming the first surface of the first disk substrate, and the second mirror-surfaced plate constitutes means for directly forming the second surface of the first disk substrate;

wherein when the first and second disk substrates are bonded together, the first surface of the first disk substrate faces the first surface of the second disk substrate; and wherein the cylindrical member is stepped radially to form a shoulder portion that faces a surface of the first mirror-surfaced plate, and the mold comprises a spacer positioned between the shoulder portion and the surface of the first mirror-surfaced plate to space the cylindrical member such that the end surface of the cylindrical member is flush with the first cavity surface.

2. A mold for forming a first disk substrate according to claim 1, wherein the air discharge groove is provided disposed between said cylindrical member and the inner hole of said mirror-surfaced plate.

3. A mold for forming a first disk substrate having a first surface having a no information area and a second surface on an opposite side of the first surface of the first disk substrate, the first disk substrate being bonded to a second disk substrate by an adhesive, the second disk substrate having a first surface having an information area and a second surface on an opposite side of the first surface of the second disk substrate, the no information area on the first disk substrate being formed in the same position as the information area on the second disk substrate, the first disk having a groove formed therein, and the no information area on the first surface of the first disk substrate is adhesively bonded to the information area on the first surface of the second disk substrate, the mold comprising:

a first mirror-surfaced plate forming a first surface of a cavity of said mold corresponding to the no information area on the first surface of the first disk substrate, the first mirror-surfaced plate comprising an inner hole in which a cylindrical member is inserted and fitted, said cylindrical member comprising an annular projection provided on its end surface adjacent to the cavity for forming the annular groove on the first surface of the first disk substrate;

a second mirror-surfaced plate forming a second surface of the cavity of said mold opposed to said first mirror-surfaced plate, and wherein the first mirror-surfaced plate and the cylindrical member constitute means for directly forming the first surface of the first disk substrate, and the second mirror-surfaced plate constitutes means for directly forming the second surface of the first disk substrate;

wherein when the first and second disk substrates are bonded together, the first surface of the first disk substrate faces the first surface of the second disk substrate;

wherein the mirrored surface of at least one of said first and second mirror-surfaced plates is roughened; and wherein the cylindrical member is stepped radially to form a shoulder portion that faces a surface of the first mirror-surfaced plate, and the mold comprises a spacer positioned between the shoulder portion and the surface of the first mirror-surfaced plate to space the cylindrical member such that the end surface of the cylindrical member is flush with the first cavity surface.

4. A mold for forming first disk substrate according to claim 1, further comprising male and female cutting elements on opposite sides of the mold for forming a center hole in the disk, the cutting elements being positioned radially inward of the annular projection.

5. A mold for forming first disk substrate according to claim 1, wherein the annular projection has a substantially trapezoidal or semicircular shape in cross-section.

6. A mold for forming first disk substrate according to claim 3 wherein the annular projection has a substantially trapezoidal or semicircular shape in cross-section.

7. A mold for forming first disk substrate according to claim 1, wherein the annular projection has a height in the range of about 0.15 to about 0.25 mm.

8. A mold for forming first disk substrate according to claim 3, wherein the annular projection has a height in the range of about 1.5 to about 0.25 mm.

9. A mold for forming first disk substrate according to claim 1, wherein the annular projection comprises a bottom portion having a width in the range of about 1.5 to about 5.5 mm.

10. A mold for forming first disk substrate according to claim 3, wherein the annular projection comprises a bottom portion having a width in the range of about 1.5 to about 5.5 mm.

11. A mold for forming first disk substrate according to claim 1, wherein the annular projection has a maximum diameter at an outer periphery of approximately 22.2 mm.

12. A mold for forming first disk substrate according to claim 3, wherein the annular projection has a maximum diameter at an outer periphery of approximately 22.2 mm.

13. A mold for forming first disk substrate according to claim 3, wherein the roughened mirror surface of the at least one of said first and second mirror-surfaced plates have projections having a height in a range of about 5 to about 30 micrometers in terms of Ry in the Japanese Industrial Standard.

* * * * *